(12) United States Patent
Hinson et al.

(10) Patent No.: US 11,427,345 B2
(45) Date of Patent: Aug. 30, 2022

(54) ASSISTED BOOM ACTUATOR

(71) Applicant: The Boeing Company, Chicago, IL (US)

(72) Inventors: Kimberly A. Hinson, Seattle, WA (US); Jung Soon Jang, Bellevue, WA (US); Blain A. Lawson, Tukwila, WA (US); Christopher M. Jacobus, Saint Louis, MO (US)

(73) Assignee: The Boeing Company, Chicago, IL (US)

( * ) Notice: Subject to any disclaimer, the term of this patent is extended or adjusted under 35 U.S.C. 154(b) by 232 days.

(21) Appl. No.: 16/835,962

(22) Filed: Mar. 31, 2020

(65) Prior Publication Data

US 2021/0300583 A1 Sep. 30, 2021

(51) Int. Cl.
*B64D 39/02* (2006.01)
(52) U.S. Cl.
CPC ................... *B64D 39/02* (2013.01)
(58) Field of Classification Search
CPC ................................................ B64D 39/02
See application file for complete search history.

(56) References Cited

U.S. PATENT DOCUMENTS

| | | | | |
|---|---|---|---|---|
| 4,129,270 A | * | 12/1978 | Robinson | B64D 39/00 141/387 |
| 7,878,455 B2 | * | 2/2011 | Adarve Lozano | B64D 39/00 244/135 A |
| 8,328,139 B2 | * | 12/2012 | Gasco Nunez | B64D 39/04 244/135 A |
| 10,807,734 B2 | * | 10/2020 | Larson | B65H 59/38 |
| 2021/0410288 A1 | * | 12/2021 | Jang | H01L 23/552 |

FOREIGN PATENT DOCUMENTS

| | | | | |
|---|---|---|---|---|
| EP | 2349840 | * | 5/2010 | ............ B64D 39/00 |
| EP | 2349840 A1 | | 8/2011 | |
| EP | 2690019 A2 | | 1/2014 | |
| EP | 3064436 A1 | | 9/2016 | |
| EP | 3459856 A1 | | 3/2019 | |

OTHER PUBLICATIONS

European Application Serial No. 20217050.2, Search Report dated Jun. 14, 2021, 9 pgs.

* cited by examiner

*Primary Examiner* — Justin M Benedik
(74) *Attorney, Agent, or Firm* — Kwan & Olynick LLP

(57) ABSTRACT

Described are systems and methods for deploying and stowing a refueling boom. In certain examples, deploying the refueling boom includes lowering a refueling boom structure with a hoist while a boom aerodynamic control surface of the refueling is deactivated, determining that first transition conditions have been met, switching the hoist actuator state mode, and activating the boom aerodynamic control surface. In other examples, stowing the refueling boom includes flying the refueling boom towards a fuselage, determining that second transition conditions have been met, switching the hoist actuator state mode, and raising a refueling boom structure of the refueling boom with the hoist.

20 Claims, 8 Drawing Sheets

ASSISTED BOOM ACTUATOR

This invention was made with Government support under contract number FA8625-11-C-6600 awarded by the Department of Defense. The Government has certain rights in this invention.

BACKGROUND

Certain aerial refueling aircraft utilize an aerial refueling boom to perform refueling. The refueling boom, when in the stowed position, is latched to the fuselage of the aircraft. Typically, when a deployment of the refueling boom is commanded, a boom aerodynamic control surface of the refueling boom generates aerodynamic lift to raise the refueling boom off a latch. The latch is then opened once the refueling boom is lifted, before the refueling boom is then lowered. The boom aerodynamic control surface then provides aerodynamic control to fly the refueling boom away from the fuselage. Conversely, when a stow of the refueling boom is commanded, the boom aerodynamic control surface flies the refueling boom up to the fuselage, the latch is closed and the refueling boom is accordingly coupled to the fuselage.

SUMMARY

Described are methods and systems for deploying and stowing a refueling boom. In a certain example, the technique includes lowering, while a hoist of a refueling boom is in a second actuator state mode, a refueling boom structure of the refueling boom with the hoist while a boom aerodynamic control surface of the refueling boom is deactivated, determining that first transition conditions have been met, switching the hoist from the second actuator state mode to a first actuator state mode, and activating the boom aerodynamic control surface.

In another example, the technique includes flying a refueling boom towards a fuselage of an aircraft while a hoist of the refueling boom is in a zero actuator state mode, determining that second transition conditions have been met, switching the hoist from the zero actuator state mode to a first actuator state mode, and raising a refueling boom structure of the refueling boom with the hoist.

Illustrative, non-exclusive examples of inventive features according to present disclosure are described herein. These and other examples are described further below with reference to figures.

BRIEF DESCRIPTION OF THE DRAWINGS

The disclosure may best be understood by reference to the following description taken in conjunction with the accompanying drawings, which illustrate various examples.

DETAILED DESCRIPTION

Figure 1A:
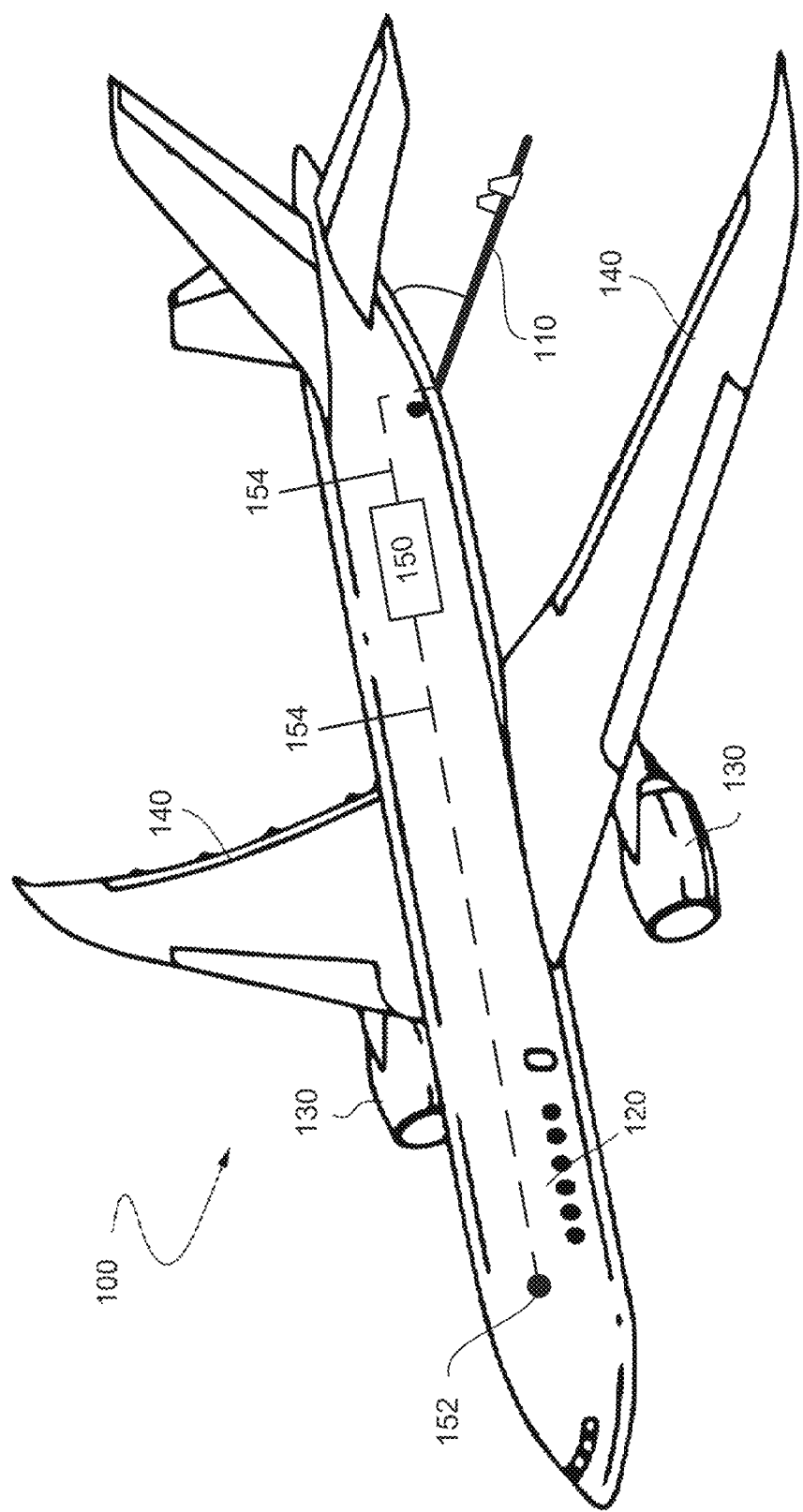
FIG. 1A illustrates a vehicle with a refueling boom, in accordance with some examples.

In the following description, numerous specific details are set forth in order to provide a thorough understanding of the presented concepts. The presented concepts may be practiced without some, or all, of these specific details. In other instances, well known process operations have not been described in detail to avoid unnecessarily obscuring the described concepts. While some concepts will be described with the specific examples, it will be understood that these examples are not intended to be limiting.

INTRODUCTION

Described herein are control techniques for a refueling boom. The refueling boom structure, in certain examples, includes a boom aerodynamic control surface which is deactivated while the hoist is in a second actuator state mode. The refueling boom control techniques include lowering a refueling boom structure with a hoist while the hoist is in the second actuator state mode, determining that first transition conditions have been met, switching the hoist from the second actuator state mode to a first actuator state mode, and activating the boom aerodynamic control surface after the hoist is in the first actuator state mode.

In certain examples, aerial refueling aircrafts include an aerial refueling boom. The aerial refueling boom is located along the fuselage of the aircraft in certain examples and is stowed by being latched to the fuselage of the aircraft. In such configurations, when deployment of the refueling boom is commanded, a boom aerodynamic control surface (e.g., a boom elevator) of the refueling boom generates aerodynamic lift to raise the refueling boom off a latch. The latch is then opened once the refueling boom is lifted, before the refueling boom is then lowered. The boom aerodynamic control surface then provides control to fly the refueling boom away from the fuselage. When a stow of the refueling boom is commanded, the boom aerodynamic control surface flies the refueling boom up to the fuselage and the refueling boom is accordingly latched to the fuselage.

In certain examples, a single command stow and deploy throughout the entire aerial refueling envelope improves usability and is required in certain applications. However, at slow airspeeds, the boom aerodynamic control surface does not generate enough aerodynamic lift to lift the boom up above the latch. In examples described herein, in this region of the flight envelope, the hoist is used to lift the boom off the latch instead.

In certain such examples, the techniques described herein are used as a retrofit or update to existing systems. Certain existing systems include hoists that are not originally intended to be used in the deploying the refueling boom. In certain such systems, to prevent damage to various components of the system, it is essential that both the hoist actuator (controlling movement of the hoist) and the aerodynamic actuator (controlling movement of the boom aerodynamic control surface) are not active at the same. The techniques described herein allow for coordination and collaborative efforts between the two dissimilar actuators (e.g., the hoist actuator and the elevator actuator) to allow for single button stow and deploy throughout the aerial refueling envelope.

An example of a vehicle equipped with refueling boom is shown in FIG. 1A. FIG. 1A illustrates a vehicle with a refueling boom, in accordance with some examples. FIG. 1A illustrates vehicle 100 that is a fixed wing aircraft, but other examples include other structures (e.g., helicopters, variable wing aircraft, short takeoff and landing aircraft, spacecraft, drones, and other such vehicles).

Vehicle 100 includes fuselage 120, wings 140, and aircraft propulsors 130. Each of aircraft propulsors 130 are coupled to a respective wing 140. Wings 140 are coupled to fuselage 120. Vehicle 100 further includes refueling boom 110 coupled to a portion of fuselage 120 (e.g., an aft fuselage 120). Further details of refueling boom 110 are shown and described in FIG. 1B.

Refueling boom 110 is controlled by controller 150. Controller 150 includes, in various examples, a memory, a processor, and other logic device components. Controller 150 receives data, performs calculations, and provides outputs (e.g., control instructions) to various other portions of vehicle 100. Controller 150 is communicatively coupled to refueling boom 110 through communication network 154. In certain examples, communication network 154 is any type of wired and/or wireless network that communicates data and/or power to and from controller 150. Controller 150 is also coupled to sensors 152 via communication network 154. Sensors 152 include air speed, air pressure (e.g., dynamic pressure), altitude, and other such sensors to measure readings associated with operation of vehicle 100. In certain examples, sensors 152 also include an additional hoist cable break monitor configured to determine whether the cable of hoist 114 (described in FIG. 1B) is broken. Controller 150, in various examples, is configured to determine parameters and/or cause various systems to perform the operations described herein.

Refueling Boom Example

Figure 1B:
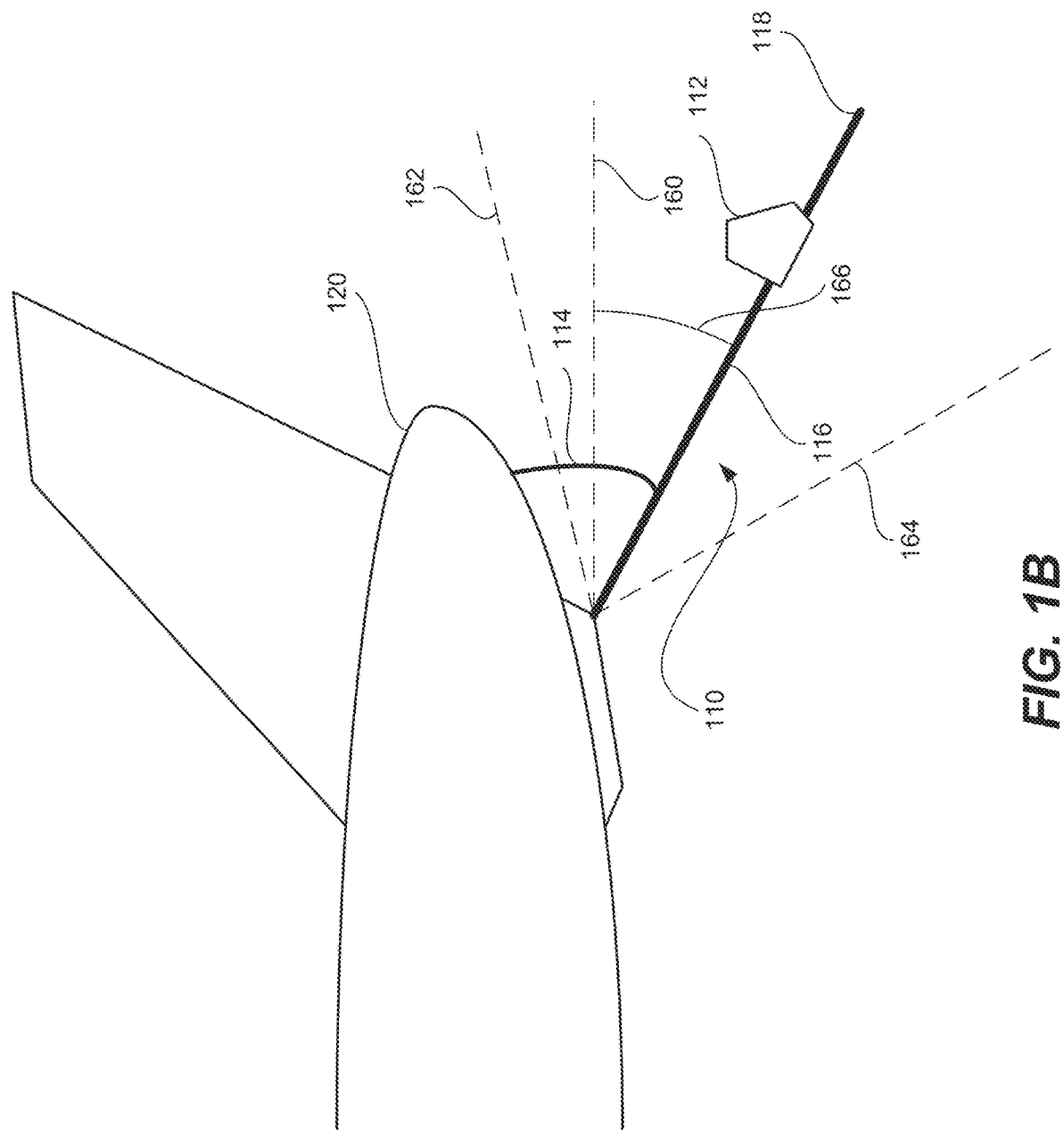
FIG. 1B illustrates a side view of the rear of the vehicle with the refueling boom, in accordance with some examples.

FIG. 1B illustrates a side view of the rear of the vehicle with the refueling boom, in accordance with some examples. FIG. 1B illustrates refueling boom 110 coupled to fuselage 120. In various examples, refueling boom 110 is coupled to fuselage 120 and, when in a stowed position, is latched to fuselage 120. Refueling boom 110 is, in certain examples, a "flying boom" configuration of an aerial refueling system.

Refueling boom 110 includes refueling boom structure 116, hoist 114 coupled to refueling boom structure 116, and boom aerodynamic control surface 112 coupled to refueling boom structure 116. Refueling boom structure 116 includes a boom tip 118. Boom tip 118 is configured to be inserted into a refueling receptacle of an associated aircraft to deliver fuel to the associated aircraft.

In certain examples, hoist 114 is configured to move refueling boom structure 116 while aircraft 100 is on the ground (e.g., has landed). Hoist 114 includes a cable configured to control movement of refueling boom structure 116. In certain examples described herein, hoist 114 is configured to be operated in situations where boom aerodynamic control surface 112 does not generate enough aerodynamic lift to be able to lift and/or control refueling boom structure 116. Thus, the techniques described herein allow for usage of hoist 114 to deploy and stow refueling boom 110 in operating conditions where boom aerodynamic control surface 112 would not otherwise generate enough lift or provide sufficient control to deploy or stow refueling boom 110. In certain examples, hoist 114 includes a cable break monitor to determine whether the cable of hoist 114 is intact.

Operation of hoist 114 is controlled, partially or fully, by a hoist actuator. The hoist actuator is operated in one of a plurality of different modes. Such modes include, for example, a tension mode, a hoisting mode, and a block mode. In tension mode, the hoist actuator is configured to maintain a baseline amount of tension on the cable of hoist 114. In hoisting mode, the cable of hoist 114 is operated to hoist (e.g., pull upward) refueling boom structure 116 towards fuselage 120. In hoisting mode, the tension imparted to the cable of hoist 114 is, in certain situations, significantly higher than the tension imparted in tension mode. In block mode, refueling boom 110 is in a stored position (e.g., is disposed underneath proximate to fuselage 120). The cable of hoist 114, in block mode, is locked. In various examples, the hoist actuator transitions between different modes through operation of a clutch.

Boom aerodynamic control surface 112 is coupled to a portion of refueling boom structure 116. Boom aerodynamic control surface 112 includes one or more wing structures and/or other aerodynamic features configured to generate lift when aircraft 100 is flying at speed. In certain examples, various portions of boom aerodynamic control surface 112 are configured to be manipulated (e.g., pivoted) to provide control over the flight characteristics of refueling boom structure 116.

Operation of boom aerodynamic control surface 112 is controlled, partially or fully, by one or more aerodynamic actuators. In certain examples, boom aerodynamic control surface 112 includes both an elevator and one or more rudders. In such a configuration, the aerodynamic actuators include an elevator actuator to control the elevator and one or more rudder actuators to control the one or more rudders.

In various examples, refueling boom 110 (e.g., refueling boom structure 116) is configured to rotate over a range of angles. Such angles are referred to herein as boom pitch angle 166. Boom pitch angle 166, as described herein, is determined from neutral angle 160. In certain examples, neutral angle 160 is parallel with a centerline of fuselage 120 or oriented in another manner. Refueling boom structure 116, as described in FIG. 1B, is configured to rotate between upper angle limit 162 and lower angle limit 164. In various examples, rotation of refueling boom structure 116 above neutral angle 160 (e.g., toward upper angle limit 162 such as when in a stored position) is considered rotation in a negative angle while rotation of refueling boom structure 116 below neutral angle 160 (e.g., toward lower angle limit 164 such as when deployed) is considered rotation in a positive angle. As shown in FIG. 1B, boom pitch angle 166 is positive as refueling boom structure 116 is rotated below neutral angle 160.

Refueling Boom Operating States

Figure 2A:
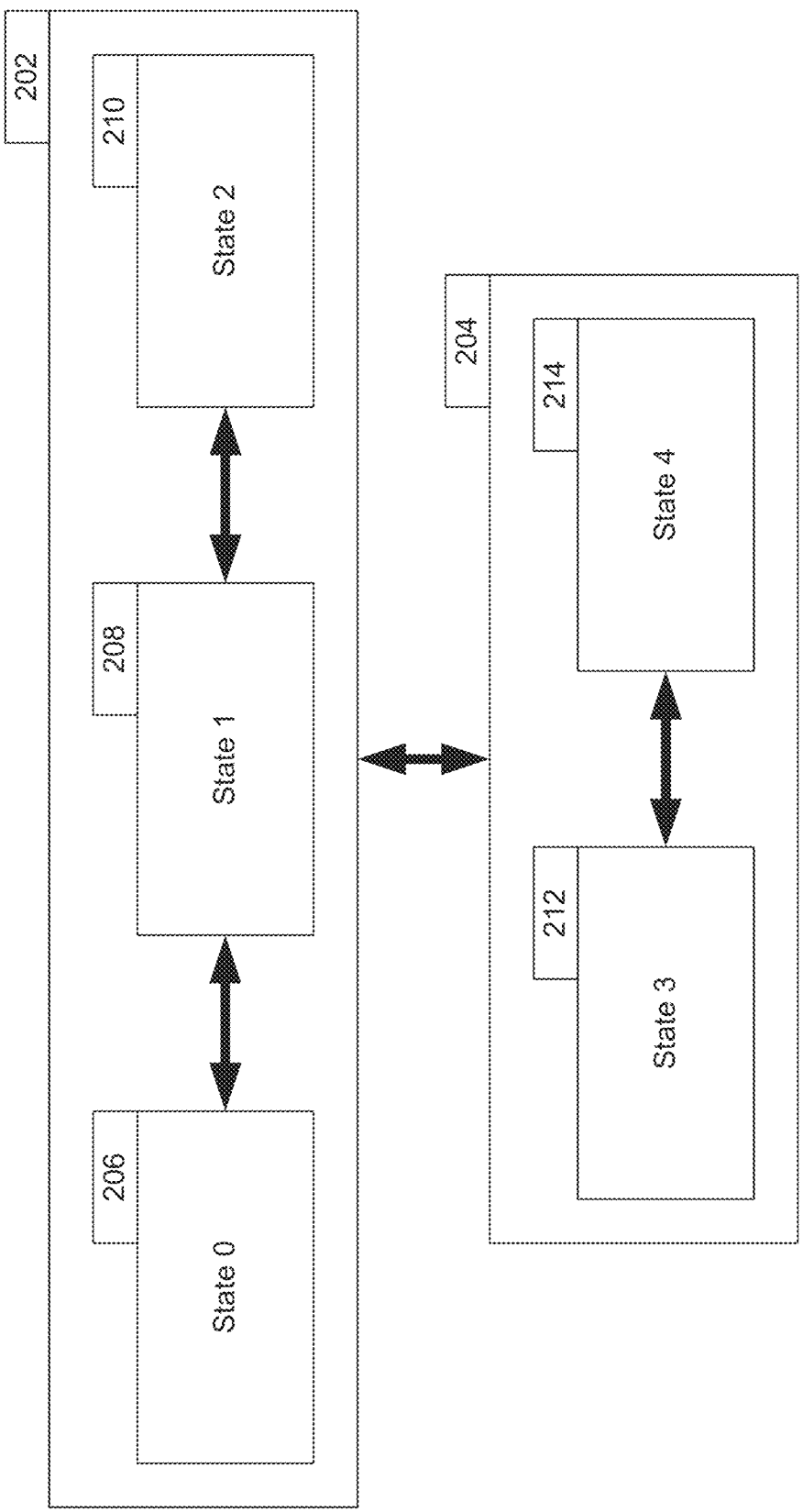
FIG. 2A illustrates a representation of various states of a refueling boom, in accordance with some examples.

FIG. 2A illustrates a representation of various states of a refueling boom, in accordance with some examples. Refueling boom 110 is, in various examples, configured to operate in a plurality of different operating state modes. The various operating state modes include operating states for the various actuators of refueling boom 110. Such operating state modes include, for example, zero to fourth actuator state modes 206-214 as described in FIG. 2A. Controller 150 is configured to determine the operating state modes, as described herein.

Zero to second actuator state modes 206-210 are a part of active mode group 202. Third and fourth actuator state modes 212 and 214 are a part of passive mode group 204. Refueling boom 110 transitions between the various actuator state modes depending on other conditions, as described herein. In certain examples, such operating conditions allows for a determination of whether conditions allow for operation of refueling boom 110 in a fly zone or a no fly zone. The fly zone and no fly zone are further described in FIG. 5

Figure 5:
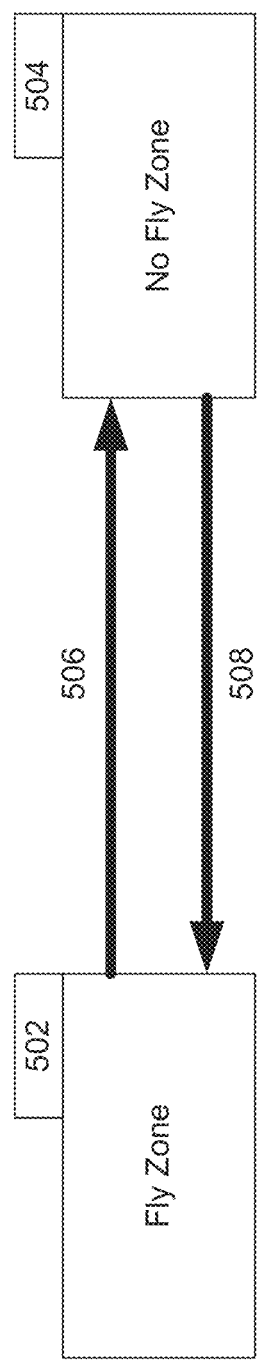
FIG. 5 illustrates a representation of transitioning between fly and no fly zones, in accordance with some examples.

FIG. 5 illustrates a representation of transitioning between fly and no fly zones, in accordance with some examples. FIG. 5 illustrates fly zone 502, no fly zone 504, and transition conditions 506 and 508. Fly zone 502 represents conditions appropriate for flying of refueling boom 110 by boom aerodynamic control surface 112. No fly zone 504 represents conditions inappropriate for flying of refueling boom 110 by boom aerodynamic control surface 112. Thus, for example, no fly zone 504 is associated with conditions where boom aerodynamic control surface 112 lacks sufficient elevator authority to fly refueling boom 110 (e.g., toward fuselage 120).

Transition between fly zone 502 and no fly zone 504, and vice versa, are allowed if transitions conditions 506 and 508 are met, respectively. Various examples include different such conditions. Controller 150 determines whether conditions indicate that aircraft 100 is within fly zone 502, no fly zone 504, or will transition between the two zones.

Transition condition 506 allows for refueling boom 110 to transition from fly zone 502 to no fly zone 504. Transition condition 506, in certain examples, include conditions associated with measured dynamic pressure and/or airspeed, boom pitch angle 166, and/or commands issued by a user. Transition condition 508 allows for refueling boom 110 to transition from no fly zone 504 to fly zone 502. Transition condition 506, in certain examples, include conditions associated with measured dynamic pressure and/or airspeed, boom pitch angle 166, a cable rate of hoist 114 (e.g., speed of movement of the cable of hoist 114), and/or commands issued by a user.

Thus, for example, transition condition 506 requires a dynamic pressure less than a threshold dynamic pressure and a boom pitch angle 166 less than a threshold pitch angle while transition condition 508 requires a dynamic pressure greater than a threshold dynamic pressure, a boom pitch angle 166 greater than a threshold pitch angle, and a cable rate less than a threshold cable rate (e.g., indicating a cable tension less than a threshold tension). Such threshold dynamic pressure and threshold pitch angle are application specific (e.g., differs based on the platform such as the refueling boom and/or aircraft used) and, in certain situations, differ between transition condition 506 and transition condition 508.

The dynamic pressure is determined by one or more pressure sensors of aircraft 100. Refueling boom 110 includes one or more sensors to determine boom pitch angle 166 and/or the cable rate. Other examples of aircraft 100 include other sensors to determine other parameters associated with fly zones and no fly zones.

In certain examples, for transition conditions 506 and 508, the threshold dynamic pressure is, in certain examples, in a slower or slowest part of the flight envelope and the threshold pitch angle is, in certain examples, above the aerial refueling envelope. User commands, for transition condition 506, include a command to stow refueling boom 110. In various examples, transition conditions 506 and 508 include different absolute ranges or different ranges. In certain examples, user commands include a command to deploy refueling boom 110.

Referring back to FIG. 2A, zero actuator state mode 206 is a state for flying of refueling boom 110. Thus, in zero actuator state mode 206, boom aerodynamic control surface 112 is active and providing lift to control refueling boom 110. The pitch axis of refueling boom 110 is controlled by the elevator actuator while the roll axis of refueling boom 110 is controlled by the one or more rudder actuators. In zero actuator state mode 206, the hoist actuator is in tension mode.

Refueling boom 110 is allowed to enter zero actuator state mode 206 (e.g., from first actuator state mode 208) if the following conditions are determined to be met: 1) that refueling boom 110 is within fly zone 502, 2) that the hoist actuator is in tension mode, 3) that the cable break monitor indicates that the hoist cable is intact, and/or 4) that a command was issued for refueling boom 110 to be flown.

First actuator state mode 208 is a state for transition of refueling boom 110 between zero actuator state mode 206 and second actuator state mode 210. In various examples, first actuator state mode 208 is a handshake state to hand-off pitch control between the hoist and aerodynamic actuators (e.g., when transitioning between zero actuator state mode 206 and second actuator state mode 210). As such, in certain examples while in first actuator state mode 208, a clutch of hoist 114 is operated to allow for transition from second actuator state mode 210 to zero actuator state mode 206 or vice versa. Operation of the clutch allows for hoist 114 to transition between modes (e.g., transitioning between tension mode, hoisting mode, and/or block mode). Such modes, in certain examples, are operated with different levels of cable tension and/or cable rates and operation of the clutch is needed in order to provide the appropriate gearing and/or torque required for operation in such modes.

In first actuator state mode 208, boom aerodynamic control surface 112 is inactive and hoist 114 is in tension mode. The pitch and roll axes of refueling boom 110 are controlled through damped trail behavior and not through one or more of the elevator actuator, the one or more rudder actuators, or the hoist actuator.

Refueling boom 110 is allowed to enter first actuator state mode 208 from zero actuator state mode 206 if the following conditions are met: 1) that refueling boom 110 is within no fly zone 504, 2) that no command was issued for boom aerodynamic control surface 112 to be active (e.g., for refueling boom 110 to be flown), and/or 3) that the cable break monitor indicates that the hoist cable is intact. Furthermore, refueling boom 110 is allowed to enter first actuator state mode 208 from second actuator state mode 210 if the following conditions are met: 1) that refueling boom 110 is within fly zone 502, 2) that no command was issued for refueling boom 110 to be stowed or for the latch to be closed to stow refueling boom 110, and/or that the cable break monitor indicates that the hoist cable is intact. Refueling boom 110 is allowed to enter first actuator state mode 208 from passive mode group 204 if a command is issued to transition from passive mode group 204 to active mode group 202.

In second actuator state mode 210, boom aerodynamic control surface 112 is inactive and hoist 114 is in hoisting mode. The pitch axis of refueling boom 110 is controlled by the hoist actuator while the roll axis of refueling boom 110 is controlled by the damped trail behavior of refueling boom 110 (e.g., not actively controlled).

Refueling boom 110 is allowed to enter second actuator state mode 210 from first actuator state mode 208 if the following conditions are met: 1) that refueling boom 110 is within fly zone 502, 2) that the elevator actuator indicates that it is not active, and/or 3) that a command was issued for hoist 114 to be in hoisting mode or for refueling boom 110 to transition from passive mode group 204 to active mode group 202.

Third and fourth actuator state modes 212 and 214 are actuator states of passive mode group 204. Passive mode group 204 are actuator states used for when refueling boom 110 is not in use. As described herein, refueling boom 110 transitions between active mode group 202 and passive mode group 204 depending on whether refueling boom 110 is in use. Thus, when a command is issued to activate refueling boom 110 for use, refueling boom 110 transitions from passive mode group 204 to active mode group 202.

In third actuator state mode 212, boom aerodynamic control surface 112 is inactive and hoist 114 is in tension mode. The pitch and roll axes of refueling boom 110 are controlled by damped trail behavior and, thus, not actively controlled. When in passive mode group 204, refueling boom 110 enters third actuator state mode 212 if the following conditions are met: 1) a command was issued for refueling boom 110 to be in a faired state, and/or 2) a command was issued for refueling boom 110 to transition to passive mode group 204 from active mode group 202.

In fourth actuator state mode 214, boom aerodynamic control surface 112 is inactive and hoist 114 is in block mode. When in passive mode group 204, refueling boom 110 enters fourth actuator state mode 214 if the following conditions are met: 1) refueling boom 110 has been in a stowed state for a threshold period of time (e.g., 20 seconds or less) from when refueling boom 110 is in third actuator state mode 212, 2) a command was issued for refueling boom 110 to be in a block mode, and/or 3) a command was issued for refueling boom 110 to transition to passive mode group 204 from active mode group 202.

Figure 2B:
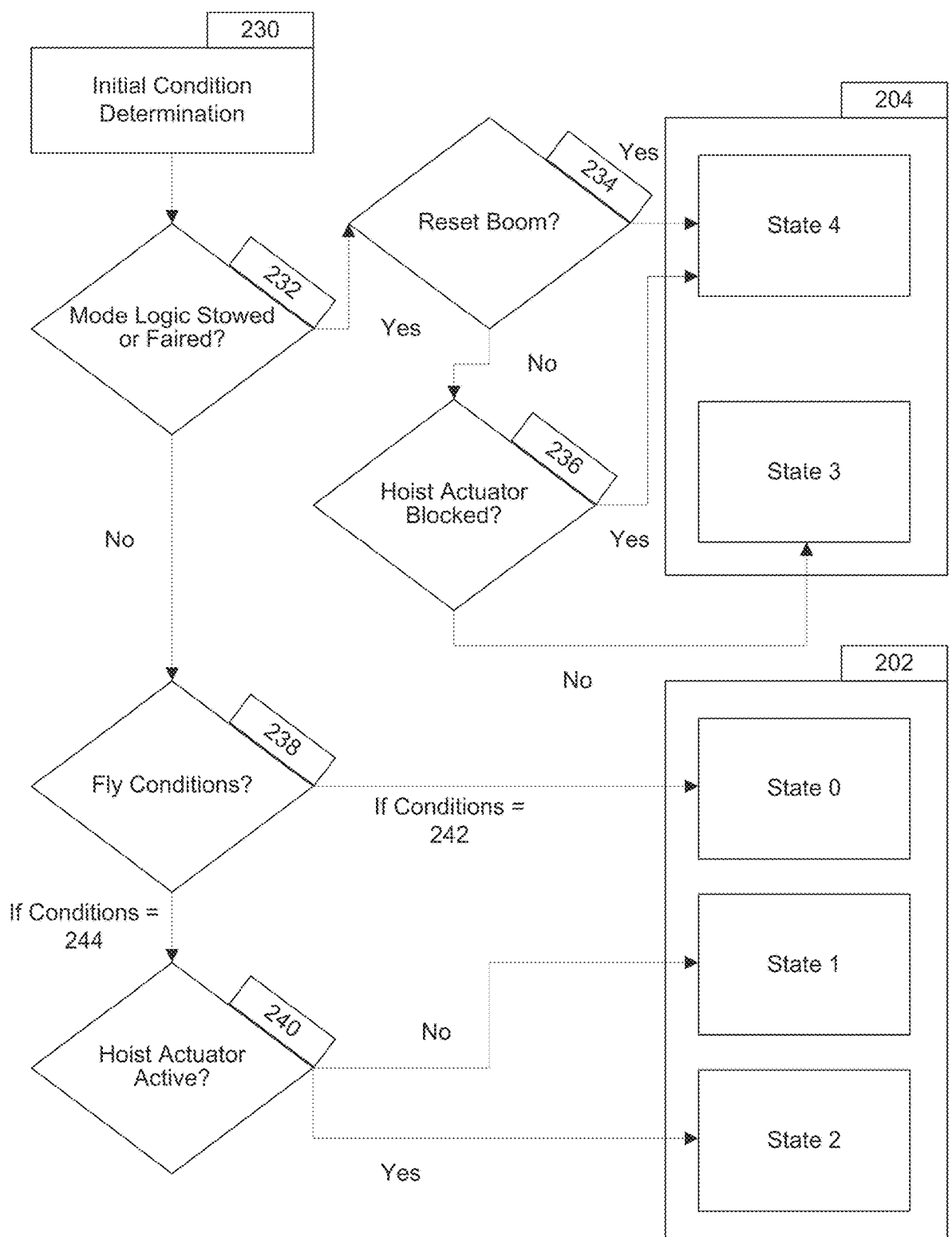
FIG. 2B is a flowchart of a technique of determining the state of a refueling boom, in accordance with some examples.

Various techniques of determining the appropriate actuator state mode are described herein. FIG. 2B is a flowchart of a technique of determining the state of a refueling boom, in accordance with some examples. The technique of FIG. 2B is used to detect the appropriate actuator state of refueling boom 110 when refueling boom 110 is in operation.

In various examples, the technique described in FIG. 2B begins with a determination of the current actuator state in block 230. In block 230, the initial condition of refueling 110 is determined. Thus, for example, block 230 detects any reset of the actuator states (e.g., resulting from a reset of controller 150) and, in response, performs an initialization process where the appropriate mode and/or actuator state is selected. Additionally, transition between active mode group 202 and passive mode group 204, or vice versa, is also detected in block 230 and results in selection of the appropriate actuator state, as detailed in FIG. 2B.

After initial conditions are determined in block 230, whether refueling boom 110 is indicating that it is in a stowed or faired condition is determined in block 232. If refueling boom 110 is in a stowed or faired condition, the technique proceeds to block 234 and passive mode group 204 is selected. Otherwise, the technique proceeds to block 238 and active mode group 202 is selected.

In block 234, a determination is made as to whether refueling boom 110 has been reset. If a reset has been performed, refueling boom 110 will, in certain examples, select in fourth actuator state mode 214. Otherwise, the state of the hoist actuator, as determined in block 236, is used to select the appropriate actuator state. Thus, for example, if hoist 114 is inactive (e.g., in a block mode), refueling boom 110 initializes in fourth actuator state mode 214. Otherwise, refueling boom 110, in certain examples, initializes in third actuator state mode 212.

If active mode group 202 is selected in block 232, flight conditions are then determined in block 238. Such flight conditions include, in certain examples, the fly zone status, the hoist actuator status, the elevator actuator status, the cable break monitor reading, and/or other sensor readings and factors used to determine the actuator state. Based on the various readings, the appropriate actuator state is selected. Accordingly, if conditions 242 (e.g., that hoist 114 is in tension mode and/or that the cable break monitor indicates that the cable is intact) are met, zero actuator state mode 206 is selected.

Otherwise, conditions 244 (e.g., that hoist 114 is not in tension mode or that cable break monitor indicates a break in the cable of hoist 114) are determined to be satisfied and the technique proceeds to block 240. In block 240, a determination is made of whether the hoist actuator is active. If the hoist actuator is active, second actuator state mode 210 is selected. Otherwise, first actuator state mode 208 is selected.

Techniques of Operating the Refueling Boom

Figure 3:
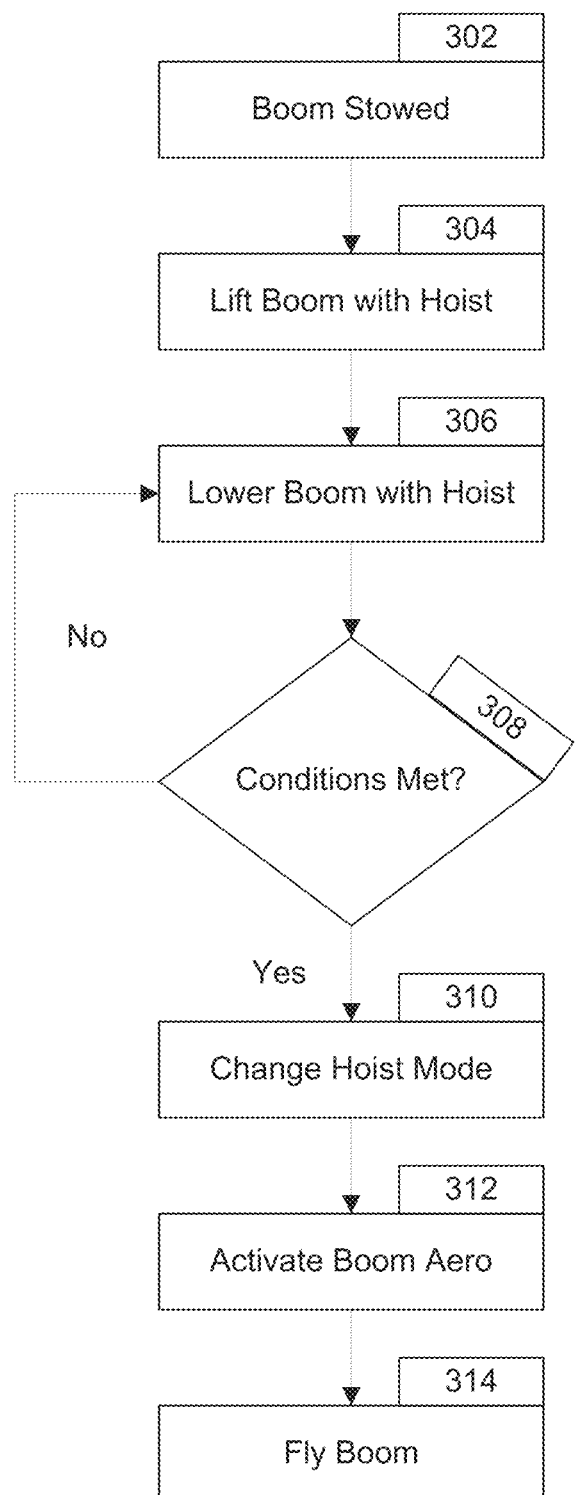
FIG. 3 is a flowchart of a technique of utilizing a refueling boom, in accordance with some examples.

FIG. 3 is a flowchart of a technique of utilizing a refueling boom, in accordance with some examples. FIG. 3 illustrates a technique of deploying the refueling boom from an initial stowed configuration. In block 302 of FIG. 3, the refueling boom starts in a stowed position. While in the stowed position, the hoist is, in certain examples, in block mode and the boom is latched to the fuselage of the aircraft. As such, the hoist actuator is in the fourth actuator state mode. While in the block mode in block 302, a command to deploy the refueling boom is received.

After receiving the command, the boom is lifted off of the latch with the hoist in block 304. The hoist actuator is in the second actuator state mode. The hoist then lowers the refueling boom in block 306 while continuing to be in the second actuator state mode. In blocks 304 and 306, the boom aerodynamic control surfaces are not active and the refueling boom is not being flown.

While lowering the refueling boom with the hoist, a determination is made of whether conditions to transition the state mode of the hoist are met, in block 308. Such conditions, in certain examples, include measuring a dynamic pressure greater than a threshold dynamic pressure (indicating that airspeed is greater than a threshold airspeed), determining that the refueling boom is lowered enough so that the boom pitch angle is greater than a threshold pitch angle, and that the cable rate is less than a threshold cable rate. Such transition conditions are, thus, used to determine whether the refueling boom transitions from a no fly zone to a fly zone appropriate for flying the refueling boom.

If it is determined that the conditions are not met, the technique returns to block 306 and the hoist continues to lower the refueling boom. If the conditions are determined to be met, the technique continues to block 310. In block 310, the state mode of the hoist actuator is changed. In certain examples, the hoist actuator is changed to the first actuator state mode and the hoist actuator is set to a tension mode. A clutch is then operated to change the operation of the hoist to allow for flying of the refueling boom (e.g., in certain examples, the hoist actuator is required to be in tension mode before the refueling boom is flown).

Once the hoist is set to tension mode, the boom aerodynamic control surfaces are activated in block 312. Activating the boom aerodynamic control surfaces includes, for example, engaging one or more wings and other aerodynamic surfaces of the refueling boom. When the aerodynamic surfaces are active, such surfaces generate lift for flying of the refueling boom. Upon activation of the boom aerodynamic control surfaces, the hoist actuator is changed to the zero actuator state mode from the first actuator state mode when appropriate conditions are detected. The refueling boom is then flown in block 314 and control of the refueling boom is through that of the boom aerodynamic control surfaces instead of through the hoist.

Figure 4:
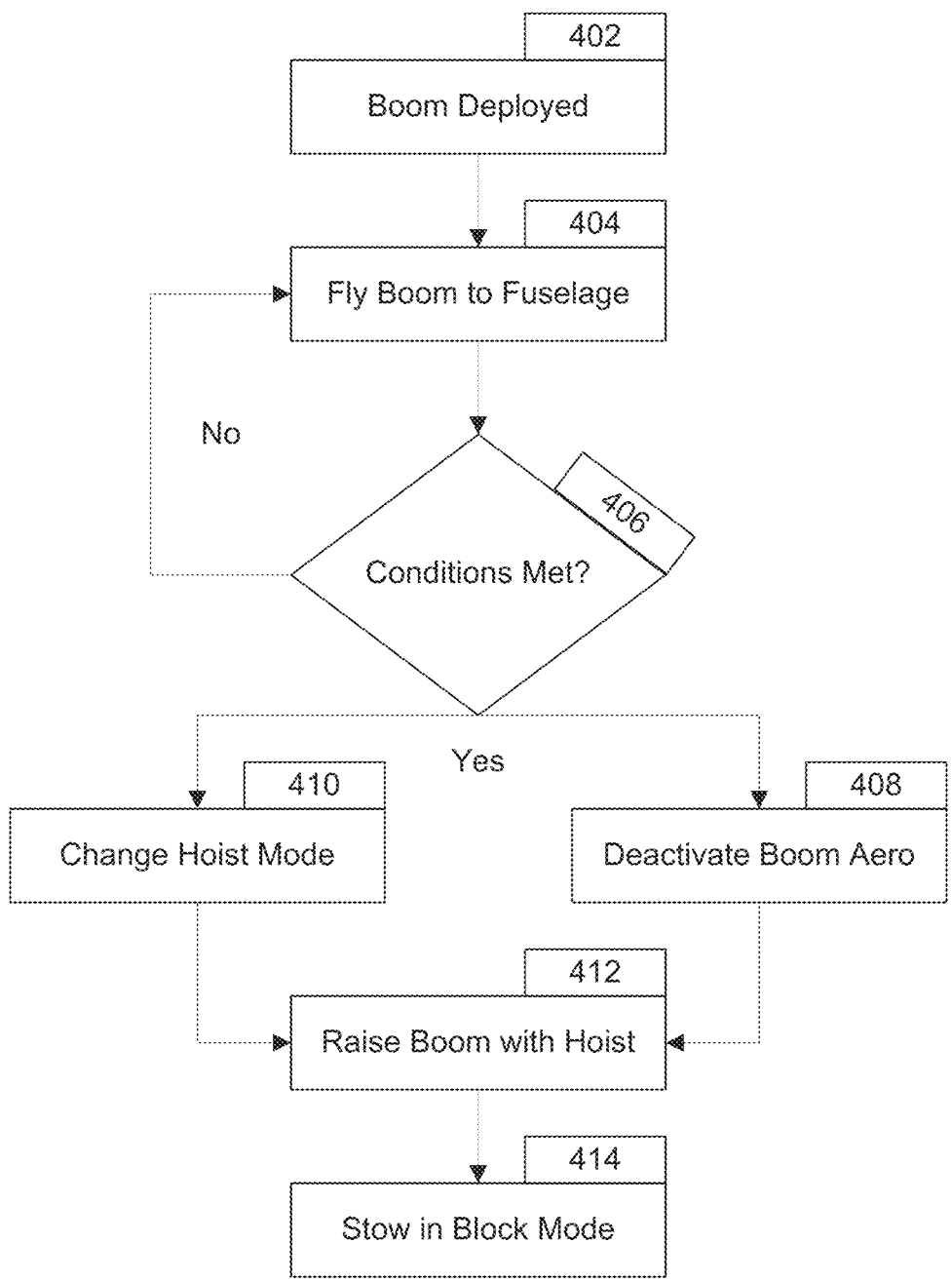
FIG. 4 is a flowchart of another technique of utilizing a refueling boom, in accordance with some examples.

FIG. 4 is a flowchart of another technique of utilizing a refueling boom, in accordance with some examples. FIG. 4 illustrates a technique of stowing the refueling boom from an initially deployed configuration. In block 402, the refueling boom is deployed. In certain examples, the refueling boom is deployed to provide refueling to other aircraft. When the refueling boom is deployed, the boom aerodynamic control surfaces are active to generate lift to control and fly the refueling boom. The hoist, in such a state of the refueling boom, is not used to control the refueling boom.

In block 404, the refueling boom is flown towards the fuselage of the aircraft by, for example, aerodynamic lift generated by the boom aerodynamic control surfaces. Flying the refueling boom towards the fuselage is, in certain examples, performed to stow the refueling boom when not in use. While flying the refueling boom, the hoist actuator is in the zero actuator state mode.

While flying the refueling boom toward the fuselage, a determination is made as to whether conditions to transition the refueling boom to hoist control are met, in block 406 (e.g., to transition to the hoist retracting the refueling boom instead of flying the refueling boom towards the fuselage). Such conditions, in certain examples, include measuring a dynamic pressure less than a threshold dynamic pressure (indicating airspeed is less than a threshold airspeed) and/or determining that the refueling boom has been flown towards the fuselage enough such that the boom pitch angle is less than a threshold pitch angle. Such transition conditions are used to determine whether the refueling boom is transitioning from a fly zone to a no fly zone where the hoist is needed to retract the refueling boom.

If it is determined that the conditions are not met, the technique returns to block 404 and the refueling boom continues to be flown towards the fuselage by the boom aerodynamic control surfaces. If the conditions are determined to be met, the technique continues to blocks 408 and 410.

In block 408, the boom aerodynamic control surfaces are deactivated. Deactivation of the boom aerodynamic control surfaces include, in some examples, deactivating or otherwise changing a configuration of the boom aerodynamic control surfaces so that less or no lift is generated.

In block 410, the actuator state mode of the hoist actuator is changed. In various examples, the actuator state mode is first changed to the first actuator state mode and the hoist actuator is set to tension mode. In certain additional examples, the first actuator state mode is a handshake mode as described herein and, after changing to the first actuator state mode and allowing for the clutch of the hoist actuator to operate, the actuator state mode is changed to the second actuator state mode and the hoist actuator is set to a hoisting mode. In other examples, the hoist actuator is changed to the second actuator state mode and, thus, the hoisting mode, in block 412.

In block 412, the refueling boom is raised with the hoist while the hoist actuator is in the second actuator state mode and in hoisting mode. The refueling boom is then raised to the fuselage and stowed proximate to the fuselage. Once it is indicated that the refueling boom is stowed, the hoist is set to the third actuator state mode and, thus, in tension mode. Past a threshold period of time, in block 414, the refueling boom is determined to be stowed and the hoist is set to the fourth actuator state mode and, thus, in block mode.

The techniques of FIGS. 3 and 4 allow for a refueling boom to be deployed and stowed with a hoist of the refueling boom in certain conditions (e.g., at certain airspeeds). As described herein, the hoist assists with certain stages of deployment and stowing of the refueling boom. When the refueling boom is fully deployed and in operation, boom aerodynamic control surfaces are used to control the refueling boom.

Vehicle Examples

While the systems, apparatus, and methods disclosed above have been described with reference to airplanes and the aerospace industry, it will be appreciated that the examples disclosed herein is applicable to other contexts as well, such as automotive, railroad, and other mechanical and vehicular contexts. Accordingly, examples of the disclosure is described in the context of an airplane manufacturing and service method 600 as shown in FIG. 6A and vehicle 100 as shown in FIG. 6B in applicable to such other contexts.

Figure 6A:
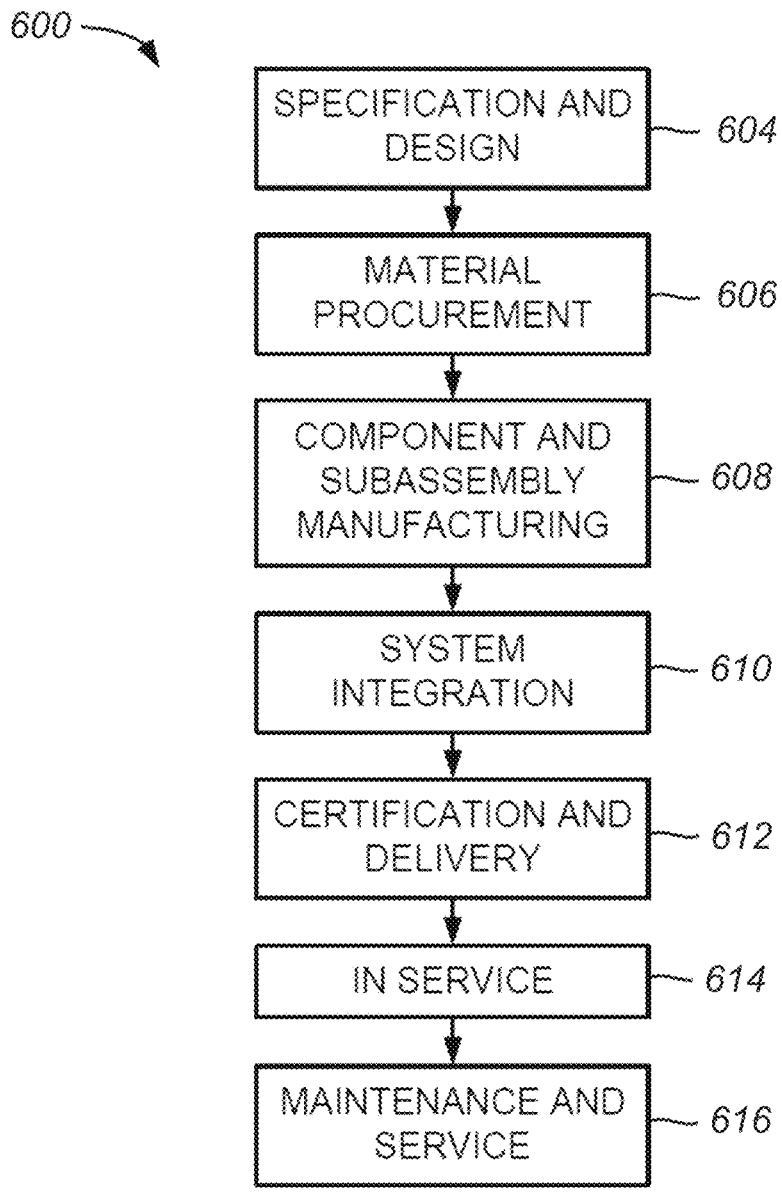
FIG. 6A illustrates a flow chart of an example of an aircraft production and service methodology, in accordance with some examples.

FIG. 6A illustrates a flow chart of an example of a vehicle production and service methodology, in accordance with some examples. In some examples, during pre-production, method 600 includes the specification and design 604 of vehicle 100 (e.g., an aircraft as shown in FIG. 1) and material procurement 606. During production, component and subassembly manufacturing 608 and system integration 610 of vehicle 100 takes place. Thereafter, vehicle 100 goes through certification and delivery 612 in order to be placed in service 614. While in service by a customer, the vehicle 100 is scheduled for routine maintenance and service 616 (e.g., modification, reconfiguration, refurbishment, and so on).

In certain examples, each of the processes of method 600 is performed or carried out by a system integrator, a third party, and/or an operator (e.g., a customer). For the purposes of this description, a system integrator includes any number of airplane manufacturers and major-system subcontractors; a third party includes any number of venders, subcontractors, and suppliers; and an operator includes, in certain examples, an airline, leasing company, military entity, service organization, and so on.

Figure 6B:
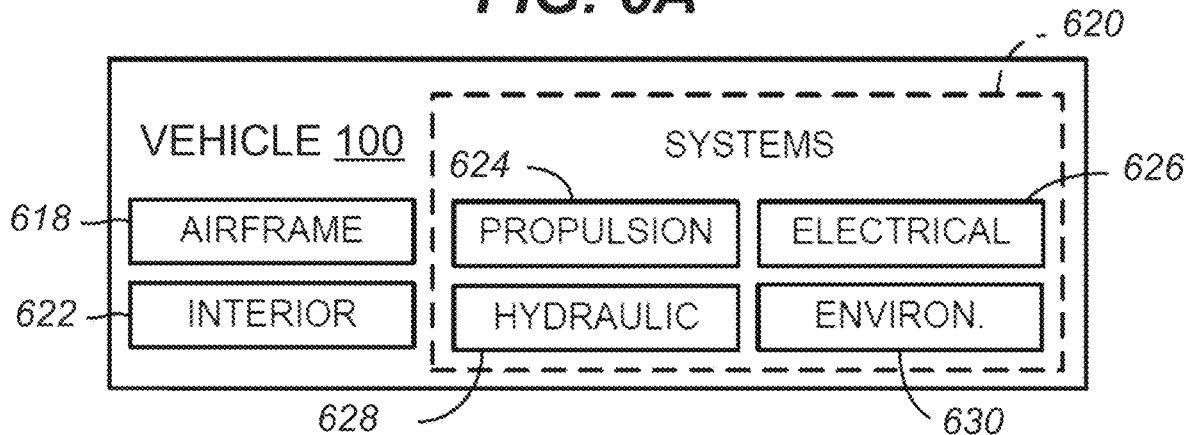
FIG. 6B illustrates a block diagram of an example of a vehicle, in accordance with some examples.

FIG. 6B illustrates a block diagram of an example of a vehicle, in accordance with some examples. As shown in FIG. 6B, the vehicle 100 (e.g., an aircraft) produced by method 600 includes airframe 618 with plurality of systems 620, and interior 622. Examples of systems 620 include one or more of propulsion system 624, electrical system 626, hydraulic system 628, and environmental system 630. In various examples, other systems are also included within vehicle 100. Although an aerospace example is shown, the principles of the embodiments disclosed herein is applicable to other industries, such as the automotive industry.

FURTHER EXAMPLES

Further, the disclosure includes examples according to the following clauses:

Clause 1. An aircraft 100, comprising:
a refueling boom 110 comprising:
a refueling boom structure 116;
a hoist 114; and
a boom aerodynamic control surface 112; and
a controller 150 configured to cause the refueling boom 110 to perform operations comprising:
lowering 306, while the hoist 114 is in a second actuator state mode 210, the refueling boom structure 116 with the hoist 114 while the boom aerodynamic control surface 112 is deactivated;

determining 308 that first transition conditions have been met;

switching 310 the hoist 114 from the second actuator state mode 210 to a first actuator state mode 208; and activating 312 the boom aerodynamic control surface 112.

Clause 2. The aircraft 100 of clause 1, wherein the operations further comprise:

flying 314 the refueling boom 110 after the activating 312 the boom aerodynamic control surface 112.

Clause 3. The aircraft 100 of clause 2, wherein the flying 314 the refueling boom 110 comprises switching the hoist 114 to a zero actuator state mode 206.

Clause 4. The aircraft 100 of clauses 2-3, wherein the flying 314 the refueling boom 110 is based on received user instructions.

Clause 5. The aircraft 100 of clause 3, wherein the switching 310 to the first actuator state mode 208 comprises operating a clutch of the hoist 114 to allow a transition from the second actuator state mode 210 to the zero actuator state mode 206.

Clause 6. The aircraft 100 of clauses 1-5, wherein the first transition conditions comprise:

a boom pitch angle 166 greater than a first threshold angle; and a hoist cable rate less than a first threshold rate.

Clause 7. The aircraft 100 of clause 6, wherein the boom pitch angle 166 is determined from a neutral angle 160.

Clause 8. The aircraft 100 of clauses 6-7, wherein the first transition conditions further comprise:

an aircraft dynamic pressure greater than a first threshold dynamic pressure.

Clause 9. The aircraft 100 of clause 8, further comprising:

a dynamic pressure sensor 152 configured to measure the aircraft dynamic pressure.

Clause 10. The aircraft 100 of clauses 1-9, wherein the operations further comprise:

lifting 304 the refueling boom structure 116 from a stowed position with the hoist 114.

Clause 11. The aircraft 100 of clause 10, wherein the lifting 304 the refueling boom structure 116 is with the hoist 114 is in a fourth actuator state mode 214.

Clause 12. The aircraft 100 of clauses 1-11, wherein the operations are performed while the aircraft 100 is in flight.

Clause 13. The aircraft 100 of clauses 1-12, wherein the operations further comprise:

flying 404 the refueling boom 110 towards a fuselage 120 of the aircraft 100 while the hoist 114 is in a zero actuator state mode 206;

determining 406 that second transition conditions have been met;

switching 410 the hoist 114 from the zero actuator state mode 206 to a first actuator state mode 208; and raising 412 the refueling boom structure 116 with the hoist 114.

Clause 14. The aircraft 100 of clause 13, wherein the raising 412 the refueling boom structure 116 comprises switching the hoist 114 to a second actuator state mode 210 from the first actuator state mode 208.

Clause 15. The aircraft 100 of clause 14, wherein the switching 410 to the first actuator state mode 208 comprises operating a clutch of the hoist 114 to allow for a transition from the zero actuator state mode 206 to the second actuator state mode 210.

Clause 16. The aircraft 100 of clauses 13-15, wherein the second transition conditions comprise a boom pitch angle 166 less than a second threshold angle.

Clause 17. The aircraft 100 of clause 16, wherein the first transition conditions further comprise:

an aircraft dynamic pressure less than a second threshold dynamic pressure.

Clause 18. The Aircraft 100 of clauses 13-17, wherein the operations further comprise:

deactivating 408 the boom aerodynamic control surface 112.

Clause 19. The aircraft 100 of clauses 13-18, wherein the operations further comprise:

stowing 414 the refueling boom 110.

Clause 20. The aircraft 100 of clause 19, wherein the stowing 414 the refueling boom 110 is with the hoist 114 in a fourth actuator state mode 214.

Clause 21. A method comprising:

lowering 306, while a hoist 114 of a refueling boom 110 is in a second actuator state mode 210, a refueling boom structure 116 of the refueling boom 110 with the hoist 114 while a boom aerodynamic control surface 112 of the refueling boom 110 is deactivated:

determining 308 that first transition conditions have been met;

switching 310 the hoist 114 from the second actuator state mode 210 to a first actuator state mode 208; and activating 312 the boom aerodynamic control surface 112.

Clause 22. The method of clause 21, further comprising:

flying 314 the refueling boom 110 after the activating 312 the boom aerodynamic control surface 112.

Clause 23. The method of clause 22, wherein the flying 314 the refueling boom 110 comprises switching the hoist 114 to a zero actuator state mode 206.

Clause 24. The method of clauses 22-23, wherein the flying 314 the refueling boom 110 is based on received user instructions.

Clause 25. The method of clauses 23-24, wherein the switching 310 to the first actuator state mode 208 comprises operating a clutch of the hoist 114 to allow a transition from the second actuator state mode 210 to the zero actuator state mode 206.

Clause 26. The method of clauses 21-25, wherein the first transition conditions comprise:

a boom pitch angle 166 greater than a first threshold angle; and a hoist cable rate less than a first threshold rate.

Clause 27. The method of clause 26, wherein the boom pitch angle 166 is determined from a neutral angle 160.

Clause 28. The method of clauses 26-27, wherein the first transition conditions further comprise:

an aircraft dynamic pressure greater than a first threshold dynamic pressure.

Clause 29. The method of clause 28, wherein the aircraft dynamic pressure is measured by a dynamic pressure sensor 152.

Clause 30. The method of clauses 21-29, further comprising:

lifting 304 the refueling boom structure 116 from a stowed position with the hoist 114, wherein the lifting 304 the refueling boom structure 116 is with the hoist 114 is in a fourth actuator state mode 214.

Clause 31. A method comprising:

flying 404 a refueling boom 110 towards a fuselage 120 of an aircraft 100 while a hoist 114 of the refueling boom 110 is in a zero actuator state mode 206;

determining 406 that second transition conditions have been met;

switching 410 the hoist 114 from the zero actuator state mode 206 to a first actuator state mode 208; and raising 412 a refueling boom structure 116 of the refueling boom 110 with the hoist 114.

Clause 32. The method of clause 31, wherein the raising 412 the refueling boom structure 116 comprises switching the hoist 114 to a second actuator state mode 210 from the first actuator state mode 208.

Clause 33. The method of clause 32, wherein the switching 410 to the first actuator state mode 208 comprises operating a clutch of the hoist 114 to allow for a transition from the zero actuator state mode 206 to the second actuator state mode 210.

Clause 34. The method of clauses 31-33, wherein the second transition conditions comprise a boom pitch angle 166 less than a second threshold angle.

Clause 35. The method of clause 34, wherein the second transition conditions further comprise an aircraft dynamic pressure less than a second threshold dynamic pressure.

Clause 36. The method of clauses 31-36, further comprising:
deactivating 408 a boom aerodynamic control surface 112 of the refueling boom 110.

Clause 37. The method of clauses 31-36, further comprising:
stowing 414 the refueling boom 110.

Clause 38. The method of clause 37, wherein the stowing 414 the refueling boom 110 is with the hoist 114 in a fourth actuator state mode 214.

CONCLUSION

Although foregoing concepts have been described in some detail for purposes of clarity of understanding, it will be apparent that certain changes and modifications may be practiced within scope of appended claims. It should be noted that there are many alternative ways of implementing processes, systems, and apparatuses. Accordingly, present examples are to be considered as illustrative and not restrictive.

The invention claimed is:

1. An aircraft, comprising:
a refueling boom comprising:
a refueling boom structure;
a hoist comprising a cable and a clutch; and
a boom aerodynamic control surface; and
a controller configured to cause the refueling boom to perform operations comprising:
lowering, while the refueling boom is in a second actuator state mode, the refueling boom structure with the hoist, wherein, in the second actuator state mode, the hoist is in a hoisting mode configured to provide an upward pull on the cable of the refueling boom and the boom aerodynamic control surface is deactivated;
determining that first transition conditions have been met; and
transitioning the refueling boom from the second actuator state mode to a zero actuator state mode, the transitioning comprising:
switching the refueling boom from the second actuator state mode to a first actuator state mode, wherein, in the first actuator state mode, the hoist is in a tension mode configured to maintain a baseline amount of tension, the baseline amount of tension less than the upward pull of the hoisting mode, on the cable of the refueling boom and the boom aerodynamic control surface is deactivated; and switching the refueling boom from the first actuator state mode to the zero actuator state mode, wherein, in the zero actuator state mode, the hoist is in the tension mode and the boom aerodynamic control surface is activated.

2. The aircraft of claim 1, wherein the operations further comprise:
flying the refueling boom after the activating the boom aerodynamic control surface.

3. The aircraft of claim 1, wherein the switching from the second actuator state mode to the first actuator state mode comprises operating the clutch to allow a transition from the second actuator state mode to the zero actuator state mode.

4. The aircraft of claim 1, wherein the first transition conditions comprise:
a boom pitch angle greater than a first threshold angle; and
a hoist cable rate less than a first threshold rate.

5. The aircraft of claim 4, further comprising:
a dynamic pressure sensor configured to measure an aircraft dynamic pressure, wherein the first transition conditions further comprise:
aircraft dynamic pressure greater than a first threshold dynamic pressure.

6. The aircraft of claim 1, wherein the operations further comprise:
lifting the refueling boom structure from a stowed position with the hoist in a fourth actuator state mode.

7. The aircraft of claim 1, wherein the operations are performed while the aircraft is in flight.

8. The aircraft of claim 1, wherein the operations further comprise:
flying the refueling boom towards a fuselage of the aircraft while the hoist is in the zero actuator state mode;
determining that second transition conditions have been met;
switching the refueling boom from the zero actuator state mode to the first actuator state mode; and
raising the refueling boom structure with the hoist.

9. The aircraft of claim 8, wherein the raising the refueling boom structure comprises switching the refueling boom to the second actuator state mode from the first actuator state mode, and wherein the switching to the first actuator state mode comprises operating the clutch to allow for a transition from the zero actuator state mode to the second actuator state mode.

10. The aircraft of claim 8, wherein the second transition conditions comprise a boom pitch angle less than a second threshold angle.

11. The aircraft of claim 10, wherein the first transition conditions further comprise:
an aircraft dynamic pressure less than a second threshold dynamic pressure.

12. The aircraft of claim 8, wherein the operations further comprise:
deactivating the boom aerodynamic control surface; and
stowing the refueling boom with the hoist in a fourth actuator state mode.

13. A method comprising:
lowering, while a hoist of a refueling boom is in a second actuator state mode, a refueling boom structure of the refueling boom with the hoist, wherein, in the second actuator state mode, the hoist is in a hoisting mode configured to provide an upward pull on a cable of the refueling boom and a boom aerodynamic control surface of the refueling boom is deactivated;

determining that first transition conditions have been met; and transitioning the refueling boom from the second actuator state mode to a zero actuator state mode, the transitioning comprising:

switching the refueling boom from the second actuator state mode to a first actuator state mode, wherein, in the first actuator state mode, the hoist is in a tension mode configured to maintain a baseline amount of tension, the baseline amount of tension less than the upward pull of the hoisting mode, on the cable of the refueling boom and the boom aerodynamic control surface is deactivated; and switching the refueling boom from the first actuator state mode to the zero actuator state mode, wherein, in the zero actuator state mode, the hoist is in the tension mode and the boom aerodynamic control surface is activated.

14. The method of claim 13, further comprising:
flying the refueling boom after the activating the boom aerodynamic control surface, wherein the switching from the second actuator state mode to the first actuator state mode comprises operating a clutch of the refueling boom to allow a transition from the second actuator state mode to the zero actuator state mode.

15. The method of claim 13, wherein the first transition conditions comprise:
a boom pitch angle greater than a first threshold angle;
a hoist cable rate less than a first threshold rate; and
an aircraft dynamic pressure greater than a first threshold dynamic pressure.

16. The method of claim 13, further comprising:
lifting the refueling boom structure from a stowed position with the hoist, wherein the lifting the refueling boom structure is with the refueling boom in a fourth actuator state mode.

17. A method comprising:
flying a refueling boom towards a fuselage of an aircraft while the refueling boom is in a zero actuator state mode wherein, in the zero actuator state mode a hoist of the refueling boom is in a tension mode configured to maintain a baseline amount of tension on a cable of the refueling boom and a boom aerodynamic control surface of the refueling boom is activated;

determining that second transition conditions have been met;

transitioning the refueling boom from the zero actuator state mode to a second actuator state mode, the transitioning comprising:

switching the refueling boom from the zero actuator state mode to a first actuator state mode, wherein, in the first actuator state mode, the hoist is in the tension mode and the boom aerodynamic control surface is deactivated; and switching the refueling boom from the first actuator state mode to the second actuator state mode, wherein, in the second actuator state mode, the hoist is in a hoisting mode configured to provide an upward pull greater than the baseline amount of tension on the cable of the refueling boom and the boom aerodynamic control surface is deactivated; and raising, with the refueling boom in the second actuator state mode, a refueling boom structure of the refueling boom with the hoist.

18. The method of claim 17, wherein the switching from the first actuator state mode to the second actuator state mode comprises operating a clutch of the hoist to allow for the transitioning from the zero actuator state mode to the second actuator state mode.

19. The method of claim 17, wherein the second transition conditions comprise:
a boom pitch angle less than a second threshold angle; and
an aircraft dynamic pressure less than a second threshold dynamic pressure.

20. The method of claim 17, further comprising:
stowing the refueling boom with the refueling boom in a fourth actuator state mode.

* * * * *